(12) United States Patent
Immig

(10) Patent No.: US 11,976,624 B2
(45) Date of Patent: May 7, 2024

(54) ENERGY CONVERSION SYSTEM FOR CONVERTING WIND ENERGY INTO ELECTRICAL ENERGY

(71) Applicant: Mario Immig, Bad Kreuznach (DE)

(72) Inventor: Mario Immig, Bad Kreuznach (DE)

(73) Assignee: Mario Immig, Bad Kreuznach (DE)

( * ) Notice: Subject to any disclaimer, the term of this patent is extended or adjusted under 35 U.S.C. 154(b) by 0 days.

(21) Appl. No.: 17/855,023

(22) Filed: Jun. 30, 2022

(65) Prior Publication Data

US 2023/0021115 A1 Jan. 19, 2023

(30) Foreign Application Priority Data

Jul. 9, 2021 (EP) ..................................... 21184836

(51) Int. Cl.
| | | |
|---|---|---|
| *F03D 1/04* | (2006.01) | |
| *F03D 1/06* | (2006.01) | |
| *F03D 7/02* | (2006.01) | |
| *F03D 9/45* | (2016.01) | |

(52) U.S. Cl.
CPC ............... *F03D 1/04* (2013.01); *F03D 1/044* (2023.08); *F03D 1/051* (2023.08); *F03D 1/0606* (2023.08); *F03D 7/0204* (2013.01); *F03D 9/45* (2016.05); *F05B 2240/13* (2013.01); *F05B 2240/133* (2013.01); *F05B 2240/14* (2013.01);
(Continued)

(58) Field of Classification Search
CPC . F03D 1/04; F03D 7/0204; F03D 9/45; F03D 1/041; F03D 1/042; F03D 1/044; F03D 1/051; F03D 1/0602; F03D 1/0606; F05B 2240/13; F05B 2240/133;
(Continued)

(56) References Cited

U.S. PATENT DOCUMENTS 2,169,165 A * 8/1939 Reedy ....................... F03D 1/00
416/128
4,379,236 A 4/1983 Inoue
(Continued)

FOREIGN PATENT DOCUMENTS

| EP | 3 150 847 A1 | 4/2017 | |
|---|---|---|---|
| GB | 2 440 264 A | 1/2008 | |
| KR | 1020190037969 A * | 4/2019 | ........... F03D 7/0204 |

OTHER PUBLICATIONS

English machine translation of KR-1020190037969-A, Mar. 6, 2023.*

(Continued)

*Primary Examiner* — Christopher Verdier
(74) *Attorney, Agent, or Firm* — Seed IP Law Group LLP

(57) ABSTRACT

An energy conversion system for converting wind energy into electrical energy includes at least one rotor having a substantially horizontal rotational axis and a plurality of rotor blades extending radially with respect to the rotational axis; a rotor mantle which fully surrounds the rotor; a plurality of wind funnels, including a first wind funnel arranged upstream of the rotor mantle and tapering towards the rotor mantle, and a second wind funnel arranged downstream of the rotor mantle and widening in a direction leading away from the rotor mantle; and a fixed frame which supports the rotor mantle and/or the plurality of wind funnels, wherein at least one adjustment device is provided, which is arranged and configured to orient the energy conversion system in a position corresponding to a prevailing wind direction.

21 Claims, 6 Drawing Sheets

(52) U.S. Cl.
CPC ... *F05B 2240/9112* (2013.01); *F05B 2250/21* (2013.01); *F05B 2250/221* (2013.01); *F05B 2250/292* (2013.01); *F05B 2250/5011* (2013.01); *F05B 2250/5012* (2013.01)

(58) Field of Classification Search
CPC .......... F05B 2240/14; F05B 2240/9112; F05B 2250/221; F05B 2250/5011; F05B 2250/5012
See application file for complete search history.

(56) References Cited

U.S. PATENT DOCUMENTS

| | | | |
|---|---|---|---|
| 6,224,338 B1 * | 5/2001 | Christaldi | F03D 1/0608 |
| | | | 415/908 |
| 10,364,795 B2 | 7/2019 | Williams | |
| 2005/0074324 A1 | 4/2005 | Yoo | |
| 2007/0009348 A1 | 1/2007 | Chen | |
| 2014/0103663 A1 * | 4/2014 | Hassan | F03D 1/04 |
| | | | 290/55 |

OTHER PUBLICATIONS

Extended European Search Report for Application No. EP 21184836.1 dated Dec. 8, 2021, 7 pgs.
First Office Action for European Application No. EP 21 184 836.1 dated Sep. 23, 2022, 5 pages.
Second Office Action for European Application No. EP 21 184 836.1 dated Feb. 21, 2023, 5 pages.

* cited by examiner

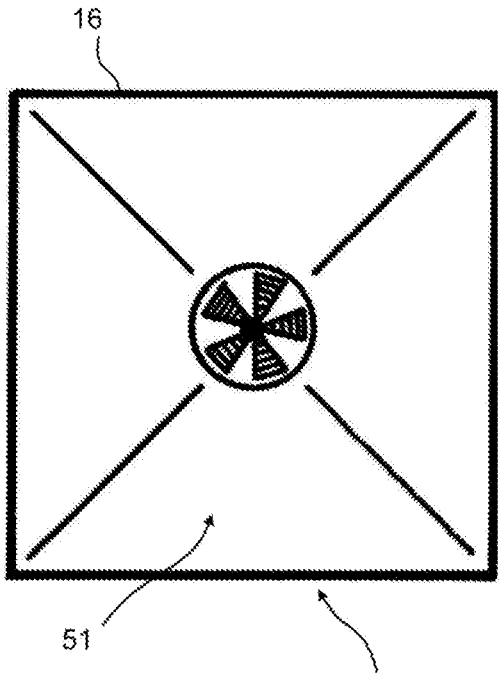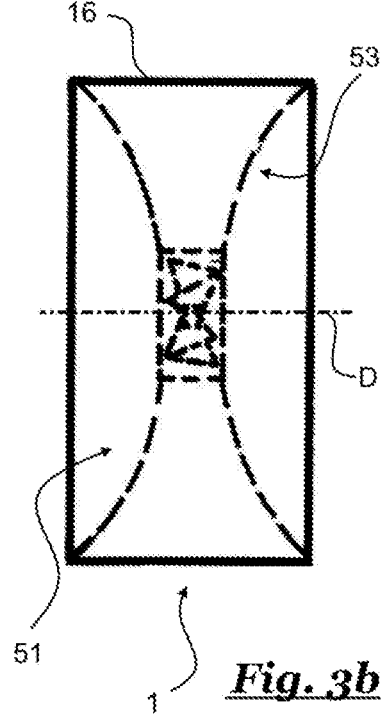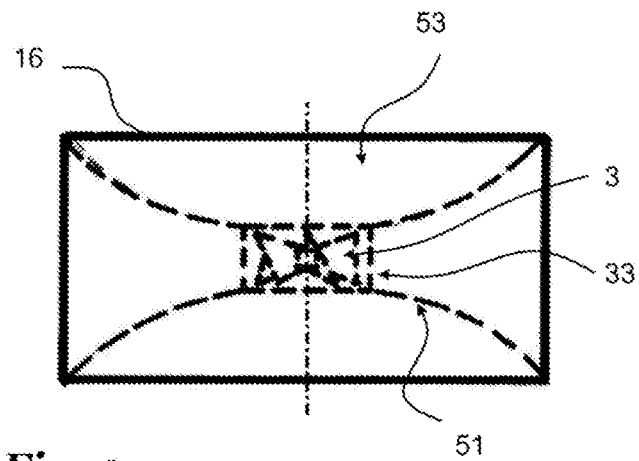

| Pos. No. | factor | efficiency | | | density | surface | velocity | | time | yield | | |
|---|---|---|---|---|---|---|---|---|---|---|---|---|
| | | vertical wind turbine | horizontal wind turbine | present disclosure | ρ | A | $v_{Wind}$ | $v_{Wind}$* | t | vertical wind turbine | horizontal wind turbine | present disclosure |
| # | 1/2 | | $C_P$ | | [kg/m³] | [m²] | [m/s] | [m/s] | [h] | | [wh] | |
| 1 | | | | | | | 0.9 | 1.5 | 583.3 | 180.2 | 225.3 | 1635.0 |
| 2 | | | | | | | 1.9 | 3.1 | 1882.6 | 5472.9 | 6841.2 | 50513.1 |
| 3 | | | | | | | 2.9 | 4.7 | 1890.3 | 19540.1 | 24425.1 | 176760.5 |
| 4 | | | | | | | 3.9 | 6.3 | 1493.6 | 37551.7 | 46939.7 | 336369.7 |
| 5 | | | | | | | 4.9 | 7.9 | 1141.3 | 56910.2 | 71137.7 | 506806.3 |
| 6 | | | | | | | 5.9 | 9.5 | 746.4 | 64972.5 | 81215.6 | 576372.6 |
| 7 | | | | | | | 6.9 | 11.2 | 451.0 | 62795.1 | 78493.9 | 570678.5 |
| 8 | 0.5 | 0.4 | 0.5 | 0.85 | 1.2 | 1.766 | 7.9 | 12.8 | 249.8 | 52200.6 | 65250.8 | 471827.5 |
| 9 | | | | | | | 8.9 | 14.4 | 132.8 | 39679.9 | 49599.8 | 357146.5 |
| 10 | | | | | | | 9.9 | 16.0 | 79.3 | 32612.2 | 40765.3 | 292545.9 |
| 11 | | | | | | | 10.9 | 17.6 | 46.3 | 25413.4 | 31766.7 | 227342.1 |
| 12 | | | | | | | 11.9 | 19.3 | 24.1 | 17213.1 | 21516.4 | 156045.0 |
| 13 | | | | | | | 12.9 | 20.9 | 13.6 | 12374.0 | 15467.5 | 111824.9 |
| 14 | | | | | | | 13.9 | 22.5 | 6.7 | 7626.4 | 9533.0 | 68735.8 |
| 15 | | | | | | | 14.9 | 24.1 | 2.8 | 3925.7 | 4907.1 | 35299.5 |
| 16 | | | | | | | 15.9 | 25.7 | 1.8 | 3066.7 | 3833.3 | 27591.0 |
| 17 | | | | | | | 16.9 | 27.4 | 1.0 | 2045.8 | 2557.2 | 18527.3 |
| 18 | | | | | | | 17.9 | 29.0 | 0.8 | 1944.7 | 2430.9 | 17573.0 |
| 19 | | | | | | | 18.9 | 30.6 | 0.5 | 1430.7 | 1788.4 | 12903.1 |
| 20 | | | | | | | 19.9 | 32.2 | 0.2 | 668.0 | 835.0 | 6013.9 |
| 21 | | | | | | | 20.9 | 33.8 | 0.3 | 1160.8 | 1451.0 | 10433.6 |
| 22 | | | | | | | 21.9 | 35.5 | 0.3 | 1335.5 | 1669.4 | 12088.4 |
| | | | | | | | sum | yield | [KWh] | 450.1 | 562.7 | 4045.0 |

*Fig. 6*

ENERGY CONVERSION SYSTEM FOR CONVERTING WIND ENERGY INTO ELECTRICAL ENERGY

BACKGROUND

Technical Field

The present disclosure relates to an energy conversion system for converting wind energy into electrical energy. The present disclosure also relates to a building having an energy conversion system of this kind. The present disclosure further relates to a kit-of-parts for an energy conversion system of this kind.

Description of the Related Art

Wind turbines usually operate according to the lift principle since it is commonly assumed that the drag principle has too poor an efficiency. Therefore, the drag principle is practically disregarded for power generation. Conventional wind turbines extract energy from the naturally blowing wind by way of a rotor. A major drawback to conventional wind turbines of this kind is that the rotor is switched off at both low and high wind speeds.

Thus, there is accordingly a need to provide an energy conversion system for converting wind energy into electrical energy, said system overcoming the drawbacks of the prior art. There is further a need to provide an energy conversion system that ensures efficient conversion of wind energy at low wind speeds and at high wind speeds and/or with changing wind directions. Alternatively or additionally, there is a need to provide an energy conversion system that is independent of location and/or can be used at any mounting location. There is further a need to provide an energy conversion unit of any size. Another or an even further need was to provide an energy conversion system that can be easily implemented by any person, such as a layperson, an untrained user and a private user. A further need was to provide an energy conversion system that can be manufactured and/or operated in an environmentally friendly manner.

BRIEF SUMMARY

Accordingly, the present disclosure provides an energy conversion system for converting wind energy into electrical energy, comprising at least one rotor having a rotor mantle, a plurality of wind funnels, a stationary frame and at least one adjustment device. The at least one rotor has a substantially horizontal rotational axis. The at least one rotor comprises a plurality of rotor blades which extend radially with respect to the rotational axis, and a rotor mantle which completely surrounds the rotor. The rotor mantle is in some cases tubular. In some cases the rotor mantle completely surrounds the area spanned by the rotor blades of the rotor, in some further cases without contact. The energy conversion unit comprises a plurality of wind funnels. A first wind funnel is arranged upstream of the rotor mantle and tapers towards the rotor mantle. The first wind funnel can also be referred to as a collecting device. The wind funnel has an inlet cross-section and an outlet cross-section. The inlet cross-section and the outlet cross-section in some cases have the same cross-sectional shape. The inlet cross-section is in some cases larger than the outlet cross-section. In some cases, a diagonal extension of the inlet cross-section is 1.1 to 10 times, in some cases 1.5 to 5 times, in some further cases about 2 times as large as a diagonal extension of the outlet cross-section.

In some cases, the first wind funnel comprises a wind inflow opening that is larger than the cross-sectional area of the rotor mantle. By way of the rotor mantle and the collecting device oriented towards the wind direction, a forced flow over the rotor surface can be achieved. A second wind funnel is arranged downstream of the rotor mantle and widens in the direction leading away from the rotor mantle. The rotor mantle acts together with the first and possibly the second wind funnel in the manner of a nozzle. The stationary frame supports the rotor mantle and/or the plurality of wind funnels.

By way of the frame, the energy conversion system can be set up in a variety of locations, such as on a land surface or on a water surface. The stationary frame, which in some cases comprises stilts or a mast, can protrude vertically in order to place the rotor in an elevated position. The at least one adjustment device is arranged and configured to orient the energy conversion system, in some cases in part, i.e., parts of the energy conversion system, or the energy conversion system as a whole, in a position corresponding to a prevailing wind direction. Thanks to the adjustment device, it can be achieved that the axis of rotation can be oriented substantially parallel to the wind direction so that the wind acts on every point of the rotor in the direction of rotation thereof. By way of the frame and the adjustment device, it can be ensured that an optimal detection of the wind can be achieved, even at high wind speeds (storm, gusts, gale-force winds), regardless of the prevailing wind direction.

In the energy conversion system according to the present disclosure, the wind speed in the area of the rotor can be significantly increased in comparison with the wind speed in the area surrounding the energy conversion unit, in some cases by at least 20%, in some other cases by at least 40%, in some even further cases by at least 60%. By increasing the wind speed, it is possible, with the energy conversion unit according to the present disclosure, to achieve a yield which by far exceeds the yield of a comparable conventional wind turbine. Furthermore, the use of the energy conversion unit allows significantly improved efficiency in comparison with conventional wind turbines because both low and very high wind speeds can be used to drive the rotor and a generator driven thereby. Unlike conventional wind turbines, only a relatively small amount of material is required to manufacture an energy conversion system according to the present disclosure, and furthermore, it is possible to avoid large-scale deforestation or clearfelling, and no solid foundations are required. Alternatively, the energy conversion system can be arranged on or in a ship or other floating body. Thus, a short payback period can be achieved for an energy conversion system due to relatively low investment costs.

BRIEF DESCRIPTION OF THE SEVERAL VIEWS OF THE DRAWINGS

Further features and advantages of the present disclosure arise from the following description, in which exemplary embodiments of the present disclosure are explained by way of example with reference to schematic drawings, without thereby limiting the present disclosure. In the drawings:

FIG. 1b is a side view of the energy conversion system according to FIG. 1a;

FIG. 1c is a schematic top view of the energy conversion system according to FIG. 1a;

FIG. 1d is a perspective view of the energy conversion system according to FIG. 1a;

FIG. 2b is a side view of the energy conversion system according to FIG. 2a;

FIG. 2c is a schematic plan view of the energy conversion system according to FIG. 2a;

FIG. 3a is a front view of an energy conversion system having a rectangular housing;

FIG. 3b is a side view of the energy conversion system according to FIG. 3a;

FIG. 3c is a schematic plan view of the energy conversion system according to FIG. 3a;

FIG. 4b is a side view of the building according to FIG. 4a;

FIG. 4c is a schematic plan view of the building according to FIG. 4a;

FIG. 4d is a perspective view of the building according to FIG. 4a; and

FIG. 6 is a table showing how the novel energy conversion system disclosed herein allows the generation of many times more electrical energy than conventional wind turbines.

DETAILED DESCRIPTION

Figure 1A:
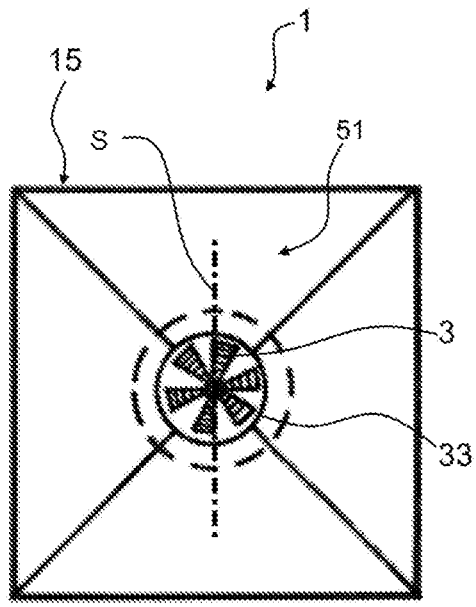
FIG. 1a is a front view of an energy conversion system having a cubic housing.

According to one embodiment of the energy conversion system, the frame supports the plurality of wind funnels stationary. In this embodiment, the wind funnels are oriented stationary. The adjustment device comprises the rotor mantle, which is movable together with the rotor relative to the frame. In some cases, the adjustment device is pivotable. The adjustment device is movable between a first position in which a first wind funnel is arranged upstream of the rotor mantle, and a second position in which another wind funnel is arranged upstream of the rotor mantle. In some cases, the adjustment device is movable between exactly 2, exactly 3, exactly 4 or more different predetermined positions, wherein, in each of the predetermined positions, a wind funnel is arranged as a collecting device upstream of the rotor mantle and the rotor rotating therein. In some cases, depending on the position, the first wind funnel, the second wind funnel, a third wind funnel or a fourth wind funnel is arranged upstream of the rotor mantle. In some cases, in each predetermined position that the adjustment device can adopt a diffuser-type wind funnel is arranged downstream of the rotor mantle. A constant, stationary orientation of the wind funnels in relation to an installation location, for example on a land surface, allows a stable construction, by way of which high wind speeds can be easily exploited to drive the rotor and an associated power generator. The number of predetermined positions can be optimized with regard to typical wind directions prevailing at the installation location and/or frequently changing wind conditions at the installation location. In conjunction with the adjustment device, the frame with the wind funnels allows good adjustability of the energy conversion system even to changing wind conditions, without the need to align the rotor to changing wind conditions, as would be the case with conventional wind turbines.

According to a further embodiment of the present disclosure, the adjustment device comprises a cylindrical or spherical rotating body which supports the rotor mantle, the rotating body being pivotable about a substantially vertical pivot axis relative to the stationary frame. The rotating body may be referred to as a valve plug. The rotor mantle and the rotor rotating therein are stably supported in the rotating body. An adjustment device having a rotating body can include guides and/or bearings arranged and configured to allow variable orientability of the rotor mantle, while providing a rigid mount capable of withstanding strong forces, such as those that can be expected in gale-force winds.

In another embodiment of the present disclosure, which can be combined with the above-mentioned embodiments, the frame comprises a housing, in some cases a cubic housing. An inner side of the housing forms the rotor mantle. At least one outer side of the housing forms the at least one wind funnel. In some cases the housing completely surrounds the rotor mantle and optionally the rotating body, in some cases the adjustment device. In some cases, the housing has at least as many outer sides as the energy conversion system has wind funnels, wherein each outer side can be associated with a wind funnel. It is conceivable for one or more wind funnels to be associated with various outer sides. In some cases, the outer sides and wind funnels are associated one-to-one with one another. The number of outer sides can exceed the number of wind funnels or vice versa. An energy conversion system of this kind allows for a very compact configuration and use of the energy conversion system even in weather conditions usually considered to be critical, for example in thunderstorms, without significant danger, for example from lightning strikes.

In some expedient cases the housing has a polygonal base surface; in some other cases, it can be expedient for the housing to have a polygonal base surface having an even number of sides, in some expedient cases a square base surface. In some expedient cases it can be provided that the base surfaces are arranged spatially parallel in pairs, for example with a north-south/east-west or northeast-southwest/northwest-southeast orientation.

Alternatively or additionally, it can be provided that the housing has an in some cases orthogonal, polyhedral or pyramidal basic shape. The basic shape extends transversely to the base surface. The basic shape is in some cases adapted to the local conditions at the installation location.

In a further embodiment, which can be combined with the preceding embodiments, the housing comprises at least one sail held on the frame. The sail forms at least one tapered funnel inner side and/or in some cases a tapered funnel outer side. In some cases, at least one sail forms at least one wind funnel each. In some cases, several sails are associated with multiple different wind funnels. Additionally or alternatively, a side surface, in some cases multiple side surfaces, in some other cases all side surfaces, as well as possibly a roof surface of the energy conversion system, can be formed by a sail, in some cases several sails.

According to one embodiment, which can be combined with the preceding embodiments, the frame has a framework structure which in some cases comprises or consists of transverse struts, horizontal longitudinal struts and/or vertical beams. The frame can in some cases produce solely a supporting structure for the rotor mantle and/or the held sail. An energy conversion system having a frame composed of a framework structure can be mounted particularly easily and allows a very stable structure. In some expedient cases the frame comprises at least one vertical beam forming a mast and/or multiple vertical beams forming stilts.

In one embodiment of an energy conversion system, which can be combined with the preceding embodiments, the at least one wind funnel, in some cases the first, the second and/or optionally further wind funnels, is frustoconical or frustopyramidal. The collecting device, i.e., the wind funnel upstream of the respective rotor mantle, as well as downstream wind funnels, can have an inlet cross-sectional shape which is, for example, square, angular, in some cases triangular, quadrangular, trapezoidal or polygonal, round, in some cases circular or elliptical. It can be expedient for the basic shape defined by the side surfaces to be adapted to the respective inlet cross-sectional shape. In some cases, multiple, in some cases all, inlet cross-sectional shapes of the energy conversion system are the same.

Alternatively or additionally, in an energy conversion system, the rotor can be arranged at an axial distance from the plurality of wind funnels. The axial distance extends between the rotor itself and the inner end of the wind funnel in question, where the wind funnel meets the rotor mantle. By providing an axial distance, it can be ensured that the wind then meets the rotor in the direction of rotation thereof.

Furthermore, an energy conversion unit can be provided with at least one display, such as an advertisement display, and/or at least one illuminator, such as LED lighting, a play of color, festive lighting, for example at Christmas, or the like.

The energy unit arranged and configured for stationary use can be connected to a vehicle or a vehicle trailer. An energy unit can in some cases be connected to a caravan or mobile home in order to supply the same with electrical energy.

The present disclosure further relates to a building comprising a plurality of building outer sides and at least one roof surface. According to the present disclosure, the building is provided with an energy conversion system, which can be configured as described above. The building can be, for example, a high-rise building, an apartment building, a commercial building, a warehouse, a gas station, a hospital, a non-residential building or a detached house. Alternatively, the building can be a shed or children's play facility. The use of an energy conversion system according to the present disclosure on a building allows electrical energy to be generated from wind energy even within densely populated areas, for example urban areas or industrial areas, where conventional wind turbines cannot be set up.

According to a further embodiment of a building having an energy conversion system, it can be provided that the first wind funnel and/or second wind funnel are arranged on a vertical building outer side and/or on a roof surface. For example, a wind funnel can be arranged on a vertical building outer side below a gable. In a building with a flat roof, it is conceivable for multiple wind funnels to be arranged on various building outer sides below the flat roof. The energy conversion system can be integrated into a building facade or a building roof.

In a further embodiment of the building, which can be combined with the preceding embodiments, the first wind funnel and/or the second wind funnel are arranged on a sloped roof surface. For example, a wind funnel can be arranged on a gable roof surface.

The present disclosure also relates to a kit-of-parts for an energy conversion system as described above. The kit-of-parts comprises struts and/or beams arranged and configured to form the frame at least in portions, in some cases the framework structure. The kit-of-parts further comprises at least one flat barrier, such as a sail, which is arranged and configured to form the housing. In some cases, the kit comprises a plurality of, in some cases different, barriers, such as different sails, which are adapted in shape for different regions of the housing.

For ease of reading, the same or similar reference signs are used in the following description of embodiments of the present disclosure for the same or similar components in different embodiments.

An energy conversion system 1 according to the present disclosure comprises at least one rotor 3 within a rotor mantle 33, various wind funnels 5, 51, 52, 53, 54 arranged around the rotor, a stationary frame 10, and at least one adjustment device 6 to align the energy conversion system to a prevailing wind direction.

FIGS. 1a-1d show an energy conversion system 1, the frame 10 of which has a cubic housing 14. The frame 10 is used to position the energy conversion system 1 stationary. For example, the cubic housing 14 could be arranged on a flat roof of a multistory building in order to supply said building with electrical energy by way of the energy conversion system 1. Alternatively, the frame 14 could be transported on a vehicle trailer in order to be positioned at a location convenient for collecting wind energy.

The lateral outer surfaces of the housing 14 are formed by four similar frustopyramidal wind funnels 5, 51, 52, 53, 54. The energy conversion system 1 can be configured in different sizes. The edge length of the energy conversion system can be in the range of 1 to 20 m. The housing 14 further has a flat, level or slightly inclined upper side 15. It is conceivable for a plurality for cubic energy conversion systems 1 to be stacked one on top of each other (not shown).

Within the housing 14 and supported by the frame 10, an adjustment device 6 is housed, which is arranged and configured to align the rotor 3 to prevailing wind conditions. The rotational axis D of the rotor 3 is oriented substantially horizontally. A currently prevailing wind direction a is shown schematically in FIGS. 1c and 1d. By way of the adjustment device 6, the rotor 3 is optimally oriented in the rotor mantle 33 to capture wind energy in the prevailing wind direction in a highly efficient manner so that said energy can be converted into electrical energy. The prevailing wind direction a corresponds to the orientation of the first wind funnel 51. The wind is guided to the rotor mantle 33 by the first wind funnel 51 or collecting device. By way of the collecting device, a wind volume significantly larger than in a conventional wind turbine can be guided to the rotor 3 to drive said rotor.

The wind coming from the prevailing wind direction a is guided through the first wind funnel 51 to the rotor mantle 33 and drives the rotor 3. Behind the rotor 3, the wind flows out of the rotor mantle 33 through the third wind funnel 53.

Figure 1B:
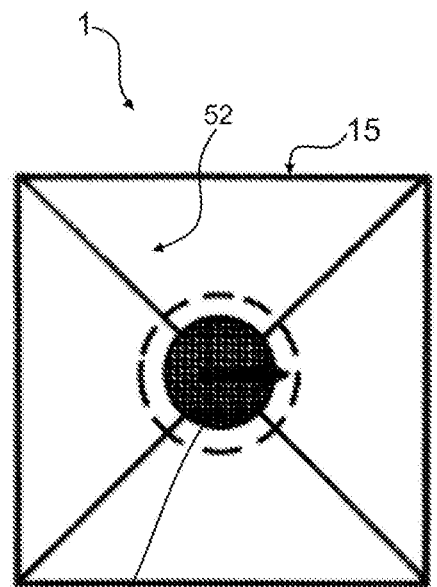
Figure 1C:
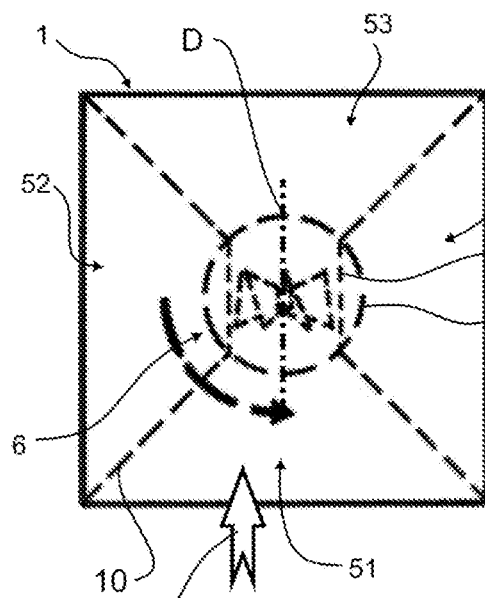
Figure 1D:
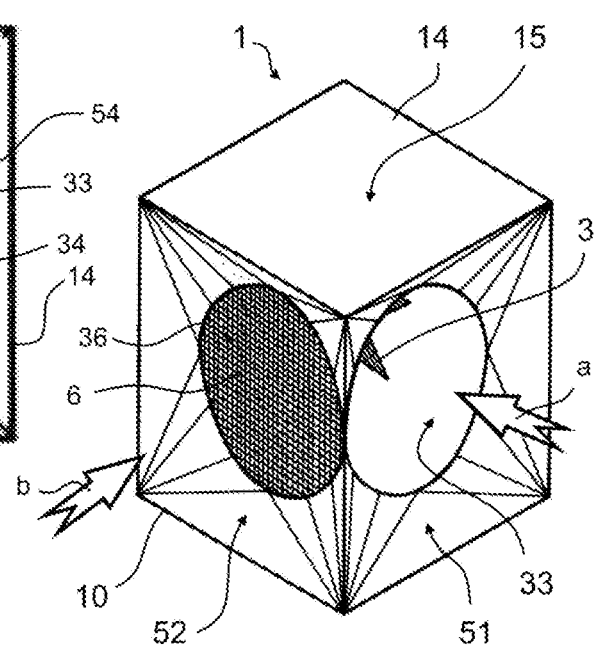

A second wind funnel 52 and a fourth wind funnel 54 are oriented transversely to the prevailing wind direction a. As can be seen in FIG. 1b, the adjustment device 6 is oriented such that an outer side 36 of the rotor mantle 33 closes the second and fourth wind funnels 52, 54 such that no losses are incurred in the region of the rotor 3.

If the prevailing wind condition changes and the wind blows in a different wind direction b corresponding to the orientation of the second wind funnel 52, the adjustment device 6 is designed and configured to reorient the rotor mantle 33 together with the rotor 3 arranged therein such that wind would be guided to the rotor 3 through the second wind funnel 52 according to the different wind direction b.

For this purpose, a rotating body 34, which can be referred to as a valve plug, can be rotated about the vertical pivot axis S, for example by about 90° in the exemplary embodiment shown here. In this way, inefficient cross-flow through the rotor 3 can be avoided.

The wind funnels 5, 51, 52, 53, 54 and the rotor mantle 33 can be provided with various devices for improving efficiency. On the wide inlet periphery of a wind funnel 5, a flanged collar can be provided, which provides shielding in the wind direction in the immediate surroundings of the wind funnel 5 so as to produce turbulence at the output, which brings about a negative pressure that facilitates the outflow of air. Alternatively, the outer periphery of the wind funnel 5 can be surrounded by a guide device at a distance therefrom, said guide device guiding wind according to the flow in the wind funnel such that the back pressure in the wind funnel is reduced (jet nozzle function). The inner side of a wind funnel 5 can be formed by peripheral constricted portions that bring about a local cross-sectional reduction and subsequent cross-sectional widening in order to reduce the back pressure. Additionally or alternatively, a radially outwardly curved, peripheral collar can be provided at the narrow output opening of the wind funnel 5, said collar bringing about a negative pressure region in the external surroundings of the wind funnel, which facilitates the outflow of air. Is some cases multiple of the above-described devices are combined.

Figure 2A:
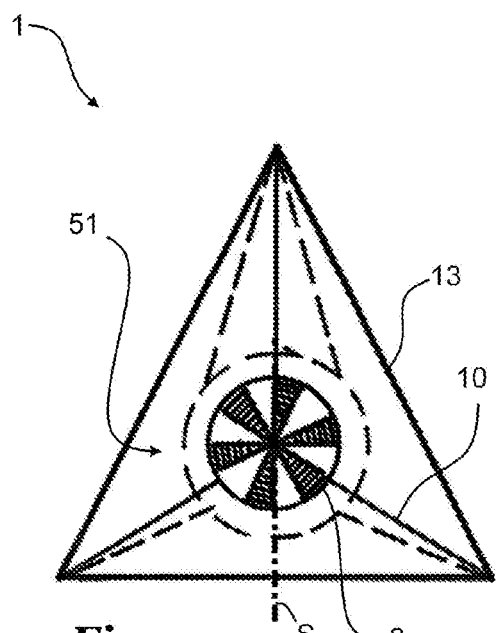
FIG. 2a is a front view of an energy conversion system having a pyramid-shaped housing.
Figure 2B:
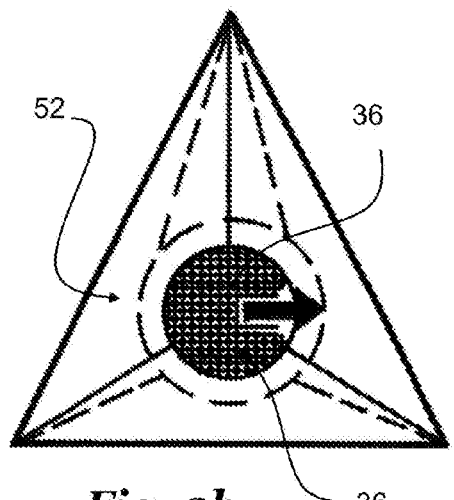
Figure 2C:
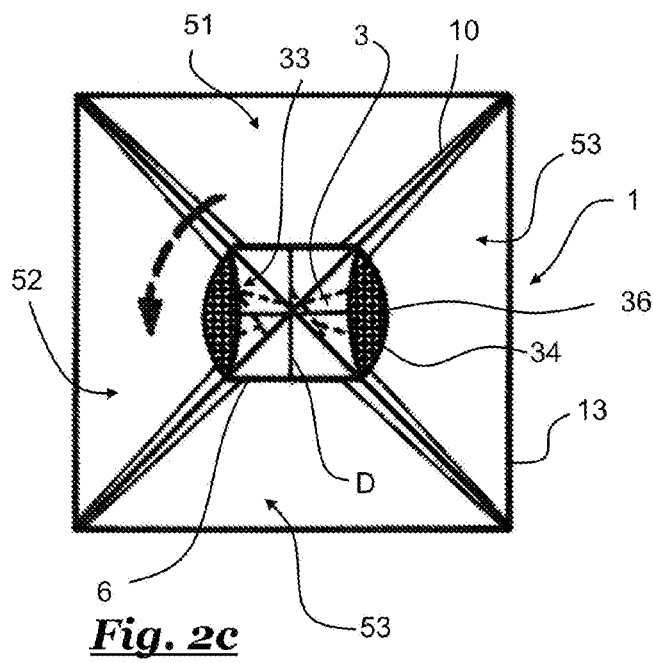
Figure 4A:
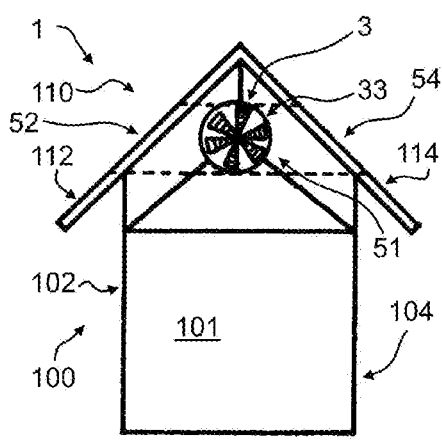
FIG. 4a is a front view of a building having an energy conversion system.
Figure 4B:
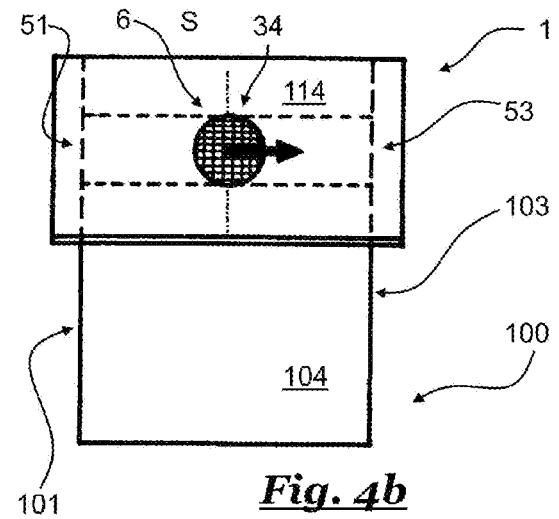
Figure 4C:
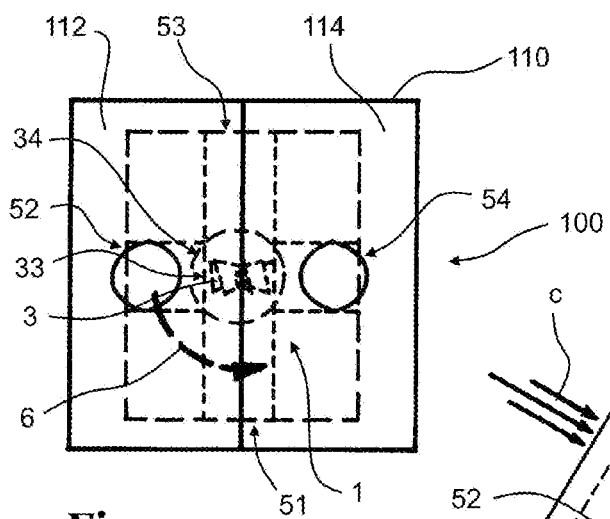
Figure 4D:
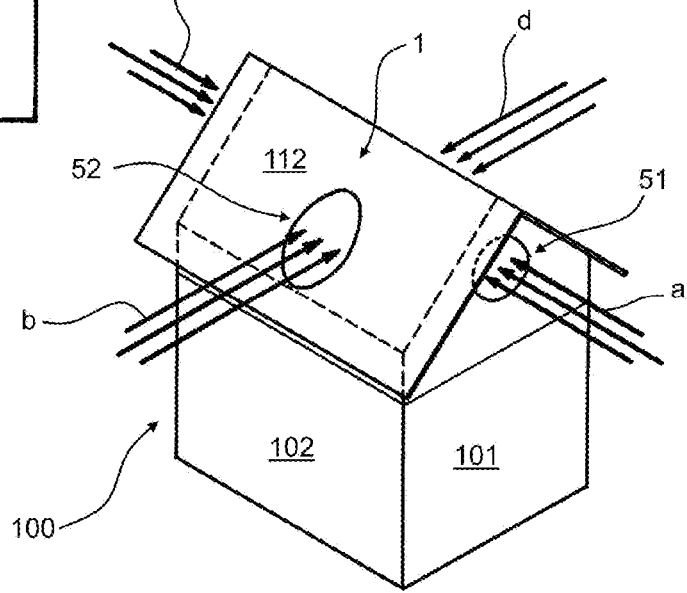

FIGS. 2a to 2c show another embodiment of an energy conversion system 1 having a pyramid-shaped housing 13. The pyramid-shaped housing 13 has a square base surface, as can be seen in the plan view according to FIG. 2c. The various wind funnels 51, 52, 53, 54 are in the shape of triangular pyramidal frustum. With the exception of the shape of the housing 13, substantially the same applies to the energy conversion system 1 as with respect to the energy conversion system 1 described above with reference to FIGS. 1a to 1d.

The housing 13 can be shaped such that the spherical rotating body 34 projects axially and/or radially into the space spanned by the wind funnels 51, 52, 53, 54. The closed outer peripheral surfaces 36 can be curved to allow continuous pivotal movement of the rotating body 34 about the vertical pivot axis S in the frame 10.

FIGS. 3a to 3c show another embodiment of an energy conversion system 1 having a cuboid housing 16 with a rectangular base cross-section, comprising exactly two wind funnels 51, 53. In the exemplary embodiment shown here, the entire housing 16 can be rotated as a rotating body about a vertical pivot axis by way of an adjustment device 6, which is not shown in greater detail. The rotational axis D of the rotor 3 and the rotor mantle 33 are fixed with respect to the rest of the housing 16. The energy conversion system is mounted with a stationary frame, which is not shown in more detail.

By way of example, FIGS. 4a to 4d show a building 100 which is provided with an energy conversion system 1 according to the present disclosure. The building 100 shown here by way of example has a gable roof 110. Opposing, sloped roof surfaces 112, 114 cover the building 100. The building has vertical building outer sides 101, 102, 103, 104 arranged in a rectangle. Wind can blow against the building 100 in various wind directions a, b, c, d.

The energy conversion system 1 of the building 100 is constructed and functions in substantially the same way as the energy conversion system described above in relation to FIGS. 1a-1d. A significant difference is the shape of the housing, which is formed by the gable roof 110 having two sloped roof surfaces 112, 114 and by the vertical building outer sides 101, 103 below the gable. Wind funnels 51, 52, 53, 54 leading to the rotor 3 are provided, offset from one another, in the vertical building outer sides 101 and 103 below the gable and in the sloped roof surfaces 112, 114. Surrounded by the rotor mantle 33, the rotor 3 is housed in a spherical rotating body 34 of the adjustment device 6. The orientation of the adjustment device 6 and thus of the rotor 3 can be adapted to a current prevailing wind direction a, b, c, or d. A channel structure can be provided between the particular wind funnel 51, 52, 53, 54 and the rotor 3 below the roof 110 to aerodynamically direct the wind to the rotor 3.

Figure 5:
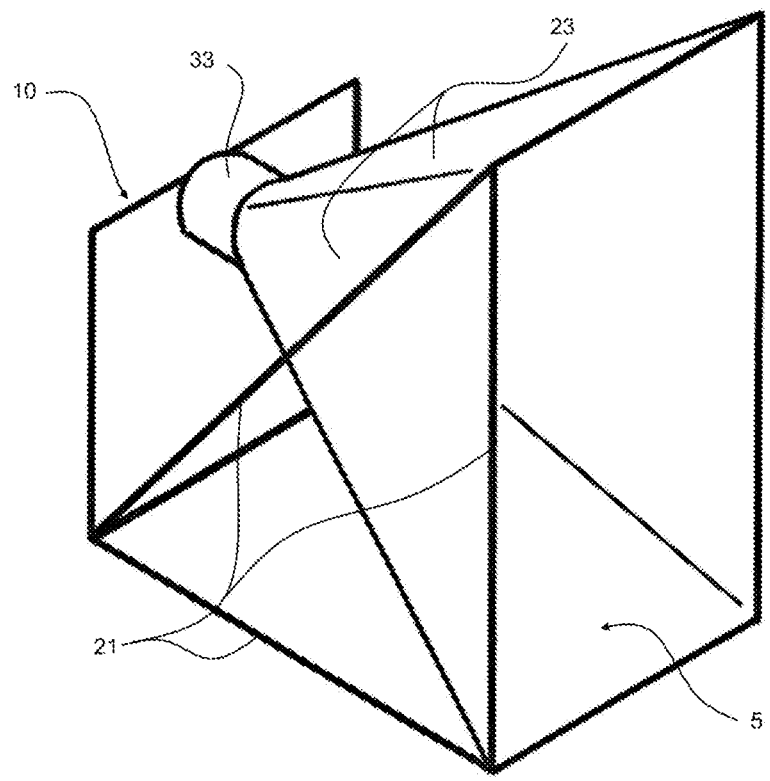
FIG. 5 is a schematic representation of an embodiment of an assembled kit-of-parts of a framework structure having a sail that forms a wind funnel for an energy conversion system.

FIG. 5 shows part of a framework frame which can be used, for example, as part of a kit-of-parts to form an energy conversion system according to the present disclosure. The kit-of-parts can comprise or consist of, for example, corner pieces, rods and a sail. The frame 10 is composed of a series of, in some cases tubular, rods made of wood, plastic and/or metal. The frame 10 forms a framework structure consisting of beams, transverse and longitudinal struts 21, and a barrier, which is formed as a sail 23 in this case. The sail 23 forms the wind funnel 5, which is in the shape of a pyramidal frustum in this case. Wind is directed through the wind funnel 5 to the rotor mantle 33.

As can be seen in FIG. 6, the novel energy conversion system allows the generation of many times more electrical energy than conventional wind turbines.

The yield E in Wh can be determined using the following formula:

$$E = \tfrac{1}{2} \times c_P \times \rho \times A \times v_{Wind} \times t$$

where $c_P$—the efficiency, which is known to be 40% for conventional vertical wind turbines, 50% for horizontal wind turbines, and at least 85% for an energy conversion system according to the present disclosure, assuming an unfavorable or "poor" system configuration;

$\rho$—the density of the air

A—the effective area of the energy conversion system, assuming the same rotor diameter of 1.5 m for the purposes of comparison, $v_{Wind}$—the wind speed, or $v_{Wind}^*$—the wind speed at the rotor in the energy conversion unit according to the present disclosure due to the effect of the wind funnel, which leads to an increase in wind speed of 62% or more, t—the average time per year, where t and $v_{Wind}$ relate to wind speed measurements by the Deutscher Wetterdienst (the national meteorological service of Germany) at Frankfurt Airport in the period from Jan. 1, 2018 to Dec. 31, 2019.

The features of the present disclosure disclosed in the above description, the claims and the drawings can be essential both individually and in any combination for implementing the present disclosure in its various embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An energy conversion system for converting wind energy into electrical energy, comprising:
    at least one rotor having a horizontal rotational axis, comprising a plurality of rotor blades extending radially with respect to the rotational axis;
    a rotor mantle which fully surrounds the at least one rotor;
    a plurality of wind funnels, including a first wind funnel being arranged upstream of the rotor mantle and tapering towards the rotor mantle, and a second wind funnel being arranged downstream of the rotor mantle and widening in the direction leading away from the rotor mantle; and
    a fixed frame which supports the rotor mantle and/or the plurality of wind funnels,
    wherein:
        at least one adjustment device is arranged and configured to orient the energy conversion system in a position corresponding to a prevailing wind direction,
        the frame supports the plurality of wind funnels stationary,
        the at least one adjustment device comprises the rotor mantle, which is movable together with the at least one rotor relative to the frame between a first position in which the first wind funnel is arranged upstream of the rotor mantle, and a second position in which another wind funnel is arranged upstream of the rotor mantle,
        the at least one adjustment device comprises a spherical rotating body which supports the rotor mantle, the rotating body being pivotable about a vertical pivot axis relative to the frame,
        the frame comprises a housing, an inner face of the housing forming the rotor mantle, and at least one outer side of the housing forming at least one wind funnel, and
        the housing has a polyhedral or pyramidal basic shape.

2. The energy conversion system according to claim 1, wherein the housing has a polygonal base surface.

3. The energy conversion system according to claim 2, wherein the base surface has an even number of sides.

4. The energy conversion system according to claim 2, wherein the base surface is quadrilateral.

5. The energy conversion system according to claim 1, wherein the housing comprises at least one sail held on the frame, the sail forming at least one tapered funnel inner side and/or at least one tapered funnel outer side.

6. The energy conversion system according to claim 5, wherein the sail forms the at least one tapered funnel outer side.

7. The energy conversion system according to claim 1, wherein the frame has a framework structure.

8. The energy conversion system according to claim 7, wherein the framework structure comprises transverse struts, horizontal longitudinal struts, and/or vertical beams.

9. The energy conversion system according to claim 1, wherein the wind funnel is frustoconical or frustopyramidal.

10. The energy conversion system according to claim 1, wherein the at least one rotor is arranged in the rotor mantle at an axial distance from the plurality of wind funnels.

11. A building having multiple building outer sides and at least one roof side, comprising an energy conversion system according to claim 1.

12. The building according to claim 11, wherein the first wind funnel and/or the second wind funnel is arranged on a vertical building outer side and/or roof side.

13. The building according to claim 11, wherein the first wind funnel and/or the second wind funnel are arranged in an inclined roof side.

14. A kit-of-parts for an energy conversion system according to claim 1, wherein the kit-of-parts comprises:
    struts and/or beams arranged and configured to form the frame at least in portions, and
    at least one flat barrier which is arranged and configured to form the housing.

15. The kit-of-parts for an energy conversion system according to claim 14, wherein the struts and/or beams are arranged and configured to form a framework structure.

16. The energy conversion system according to claim 1, wherein the rotor mantle is pivotably movable together with the at least one rotor relative to the frame between the first position in which the first wind funnel is arranged upstream of the rotor mantle, and the second position in which another wind funnel is arranged upstream of the rotor mantle.

17. The energy conversion system according to claim 1, wherein the at least one adjustment device is movable between four different positions and wherein either the first wind funnel, the second wind funnel, a third wind funnel or a fourth wind funnel is arranged upstream of the rotor mantle, depending on the position of the rotor mantle.

18. The energy conversion system according to claim 1, wherein the housing is cubic.

19. The energy conversion system according to claim 1, wherein the basic shape is orthogonal polyhedral or orthogonal pyramidal.

20. The energy conversion system according to claim 1, wherein the at least one adjustment device is movable between four different positions.

21. The energy conversion system according to claim 1, wherein either the first wind funnel, the second wind funnel, a third wind funnel or a fourth wind funnel is arranged upstream of the rotor mantle, depending on the position of the rotor mantle.

* * * * *